United States Patent [19]
Castellanet et al.

[11] Patent Number: 5,916,247
[45] Date of Patent: *Jun. 29, 1999

[54] PROCESS AND INSTALLATION FOR DELIVERING ULTRA-PURE HELIUM

[75] Inventors: Frederic Castellanet, Le Pecq; Pierre Briend, Seyssinet; Jean-Claude Boissin, Saint Ismier, all of France

[73] Assignee: L'Air Liquide, Societe Anonyme Pour l'Etude et l'Exploitation des Procedes Georges Claude, Paris Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/833,972

[22] Filed: Apr. 11, 1997

[30] Foreign Application Priority Data

Apr. 19, 1996 [FR] France .................................. 96 04955

[51] Int. Cl.$^6$ ..................................................... F17C 9/02
[52] U.S. Cl. .............................................. 62/50.2; 62/908
[58] Field of Search .......................... 62/639, 48.1, 50.1, 62/50.2, 908, 49.1, 49.2

[56] References Cited

U.S. PATENT DOCUMENTS

| | | | |
|---|---|---|---|
| 1,891,125 | 12/1932 | Van Gessel | 62/908 X |
| 3,192,730 | 7/1965 | Webb | 62/639 X |
| 3,415,069 | 12/1968 | Hauser | 62/639 |
| 3,500,652 | 3/1970 | Manns et al. | 62/908 X |
| 3,683,589 | 8/1972 | Seitz et al. | 62/908 X |
| 4,444,572 | 4/1984 | Avon et al. | 62/639 X |
| 4,607,490 | 8/1986 | Seidel et al. | 62/48.1 |
| 4,717,406 | 1/1988 | Giacobbe | 62/908 X |
| 4,766,731 | 8/1988 | Graczyk et al. | 62/50.2 X |
| 4,972,677 | 11/1990 | Moriya et al. | 62/50.2 |
| 5,303,557 | 4/1994 | Grabon | 62/49.1 |
| 5,386,707 | 2/1995 | Schulte et al. | 62/50.2 |
| 5,557,924 | 9/1996 | Blanton et al. | 62/908 X |

FOREIGN PATENT DOCUMENTS

| | | | |
|---|---|---|---|
| 6-241654 | 9/1994 | Japan | 62/639 |
| 6273036 | 9/1994 | Japan | 62/908 |
| 2009412 | 3/1994 | Russian Federation | 62/908 |
| 1419241 | 9/1991 | U.S.S.R. | 62/908 |

*Primary Examiner*—Christopher B. Kilner
*Attorney, Agent, or Firm*—Young & Thompson

[57] ABSTRACT

In order to deliver ultrapure helium to a utilization line (1), helium is withdrawn, in liquid or supercritical form, from a storage tank (3), it is filtered in this liquid or supercritical form (at 4), the filtered helium is vaporized and the resulting helium gas is sent to the utilization line (1). The process is applicable to the cooling of integrated-circuit wafers.

14 Claims, 1 Drawing Sheet

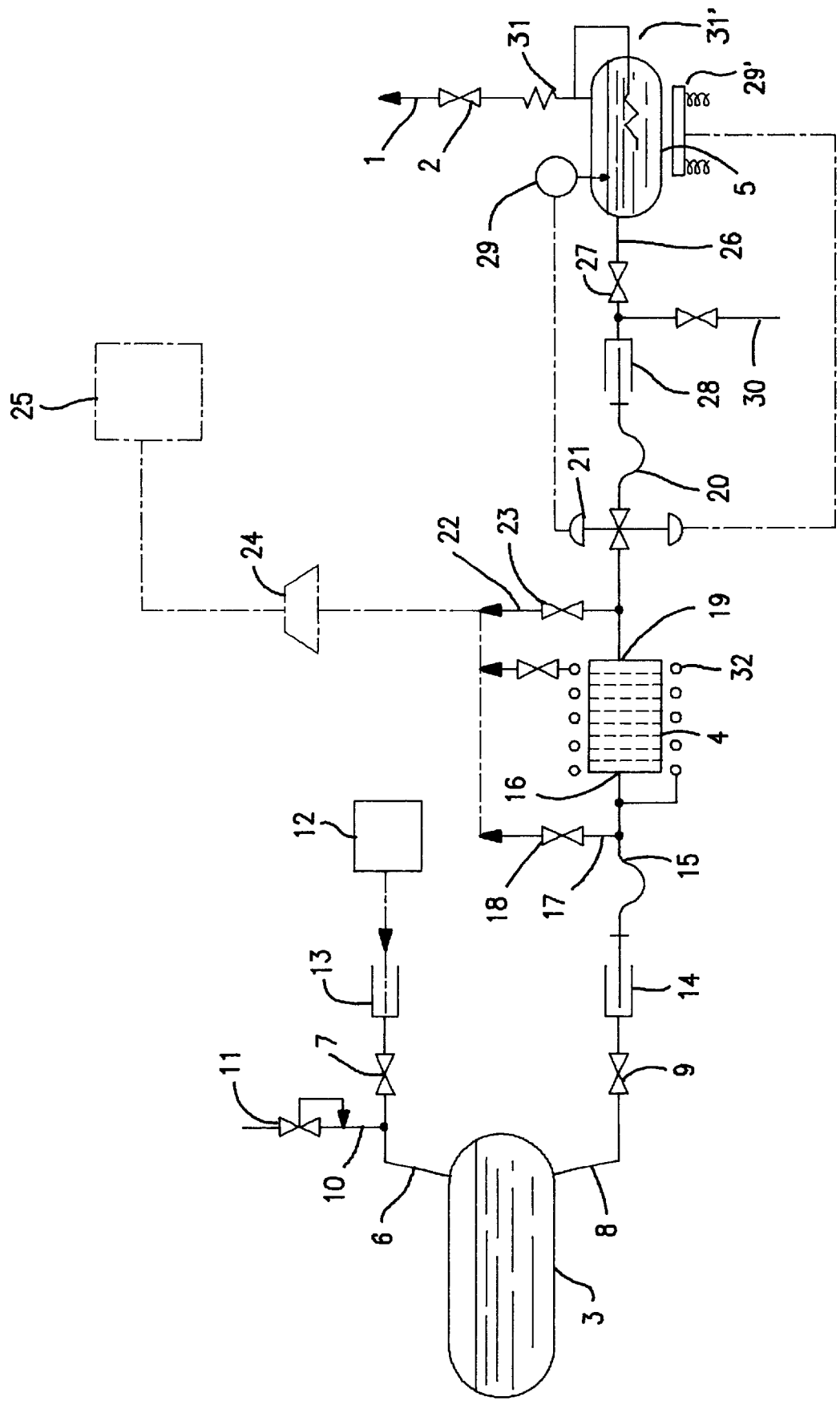

PROCESS AND INSTALLATION FOR DELIVERING ULTRA-PURE HELIUM

FIELD OF THE INVENTION

The present invention relates to a process for delivering ultrapure helium to a utilization line.

The pressures referred to here are absolute pressures.

BACKGROUND OF THE INVENTION

Ultrapure helium is, in particular, used in the electronics industry, for keeping at a constant temperature and cooling wafers supporting integrated circuits forming memories or processors.

The increase in the dimensions of wafers and the reduction in the thickness of the successive layers constituting the integrated circuits have resulted in a growing requirement as regards the purity of the helium used. In Europe, the current requirement for some applications is a content of the order of ppb (parts per billion) for each type of impurity (hydrogen, neon, other rare gases, nitrogen, etc.) in helium.

The conventional processes for purifying helium consist in passing helium in the gas state and at high pressure (10 to 200 bar), stored in bottles or in tubes, through a cryogenic purifier containing an adsorbent generally cooled to approximately 80 K (physical adsorption) or a getter at room temperature (chemisorption of impurities other than neutral gases).

This technique is unsatisfactory because, on the one hand, storing helium gas requires much space and, on the other hand, it is necessary to use a plurality of adsorbers in series for trapping the gaseous impurities, which also takes up space and is furthermore expensive.

SUMMARY OF THE INVENTION

The object of the invention is to provide a more economical process, which requires less space for delivering ultrapure helium.

To this end, the process according to the invention is characterized in that helium is withdrawn, in liquid or supercritical form, from a storage tank, it is filtered in this liquid or supercritical form, the filtered helium is vapourized and the resulting helium gas is sent to the utilization line.

The process according to the invention may have one or more of the following characteristics:

the filtered helium is temporarily stored, in liquid or supercritical form, in a buffer vessel, and the helium gas is drawn off from this buffer vessel;

the flow rate of liquid or supercritical helium withdrawn from the storage tank is adjusted on the basis of a measurement of the quantity of liquid or supercritical helium contained in the buffer vessel;

the filter is cooled;

before commencing the withdrawal, the filter is flushed and it is cooled with a helium stream taken, in particular, from the storage tank or the buffer vessel, the flushing and cooling helium being discharged;

the liquid or supercritical helium is passed directly from the storage tank to the filter;

after withdrawal of a predetermined quantity of helium from the storage tank, the filter is heated then it is flushed and cooled with a helium stream taken, in particular, from the storage tank or the buffer vessel, the flushing and cooling helium being discharged.

A further subject of the invention is an installation for delivering ultrapure helium, intended for implementing a process as defined above This installation comprises:

a liquid or supercritical helium storage tank;

a filter suitable for filtering liquid or supercritical helium, connected to the lower part of the storage tank;

means for vaporizing the filtered helium, which are connected to the outlet of the filter; and a utilization line connected to the outlet of the vaporization means.

According to other characteristics which this installation may have:

it furthermore comprises a buffer vessel for the temporary storage of filtered liquid or supercritical helium, this buffer vessel being fitted with the vaporization means;

it comprises a flow-rate control valve arranged between the filter and the buffer vessel and controlled by the quantity of liquid or supercritical helium contained in this buffer vessel;

the filter is equipped with a cooling device;

it comprises at least one discharge tap equipped with a valve, at the inlet and/or at the outlet of the filter.

BRIEF DESCRIPTION OF THE DRAWINGS

An illustrative embodiment of the invention will now be described with reference to the appended drawing, the single figure of which schematically represents an installation according to the invention.

DETAILED DESCRIPTION OF THE INVENTION

The installation represented in the drawing is intended to deliver ultrapure helium gas at a pressure of the order of 6 bar, typically containing at most 1 ppb of each impurity, to a utilization line 1 equipped with a valve 20. This installation essentially comprises a liquid helium storage tank 3, with a large capacity of, for example, 40,000 liters, a filter 4 and a buffer vessel 5.

Two lines are connected to the tank 3: a line 6, equipped with a valve 7 and connected to the upper part of the tank, and a line 8, equipped with a valve 9 and connected to the lower part of the tank.

The line 6 makes it possible to discharge an excess of helium gas in order to keep the pressure in the tank below a predetermined limit value, via a tap 10 fitted with a safety valve 11. The line 6 also makes it possible to inject cold pressurized helium gas into the tank, this helium being taken from a suitable source 12 such as an auxiliary liquid helium tank equipped with heating means. This injection is performed by connecting the source 12 to an end connector 13 of the line 6.

The line 8 is a liquid helium withdrawal line and ends in a connector 14. A line 15, connected to the inlet 16 of the filter 4, is connected by its other end to this connector 14 and has a tap 17 fitted with a valve 18.

Leading off from the outlet 19 of the filter 4 there is an ultrapure helium line 20 fitted with a flow-rate control valve 21 and, upstream thereof, a tap 22 equipped with a valve 23.

The taps 17 and 22 are typically connected to the intake of a compressor 24 whose output is itself connected to a station 25 for filling bottles or tubes with helium gas.

At its inlet, the buffer vessel 5 has a connecting line 26 equipped with a valve 27 and with an end connector 28 to which the line 20 is connected. The buffer vessel has a level detector 29 which controls the flow-rate control valve 21. Upstream of the valve 2, the utilization line 1 has a device 31 for heating cold helium. This line 1 preferably leads off from the upper part of the buffer vessel, as represented, so as to avoid drawing off possible residual solid impurities still contained in the liquid. However, in order to produce high gas flow rates, the line 1 may also take off the liquid directly, in which case the heater 31 also serves as a vaporizer.

The inner lining as well as the accessories of the buffer vessel should be of a quality which prevents the retention and the introduction of impurities (in particular an electrolytically polished tank) The filter 4 is a micron or submicron filter made of steel fabric whose mesh dimensions are adapted to the degree of purity desired for the helium to be distributed. It may, in particular, be a filter using a "steel cloth", for example such as those marketed by the French company Gantois, or a filter made of a sintered material of the PORAL type, or else a ceramic filter.

The installation operates as follows.

Before the utilization valve 2 is opened, the filter 4 is prepared and cooled by opening the valves 9 and 23. Liquid helium thus flows through the filter and flushes the latter and the lines 8 and 15 and, simultaneously, cools them.

By way of variant, the preparation and the cooling can be carried out by opening the valves 27, 21 and 18, the liquid helium then being taken from the buffer vessel 5.

When a temperature of below 6 K is reached in the filter, the valve 23 or 18 is closed, the valve 2 is opened, as is the valve 27 if it has not already been, and the withdrawal of helium gas from the upper part of the buffer vessel causes the valve 21 to open and, consequently, liquid helium to be withdrawn from the tank 3.

If necessary, as indicated above, this withdrawal may be assisted using cold helium gas injected into the tank 3 via the line 6.

Because of its very low equilibrium temperature (4.3 to 6 K) liquid helium has the following particular feature as regards the impurities which it contains. Only the impurities hydrogen and neon are dissolved, all the others, such as the other rare gases, nitrogen, etc., as well as possible dust, being present in solid form. Furthermore, hydrogen and neon are present in the dissolved state in a proportion of less than 1 ppb.

All the impurities which must be removed down to a level of less than 1 ppb, in order to obtain the helium quality required for the utilization in question, can consequently be trapped by the filter 4, which it is easy to design accordingly.

After a predetermined quantity of liquid helium has been withdrawn from the tank 3, the filter 4 should be regenerated. This is done very simply, merely by heating the filter. To this end, all the valves are closed, apart from the valves 18 and 23 which are opened. The liquid helium contained in the filter vaporizes, then all the solid impurities such as nitrogen also vaporize and escape through the taps 17 and 22. As for the possible dust, it is found in liquid helium in such small quantities that there is no risk of it clogging the filter.

After this operation, the filter is again prepared and cooled as described above, and the withdrawal can be repeated.

A sampling take-off 30, between the connector 28 and the valve 27, makes it possible to monitor the purity of the liquid helium delivered to the buffer vessel 5.

In order to prevent the filter 4 from heating up during the periods when the valve 21 is closed, and releasing the trapped solid impurities by vaporization, a cooling device 32 may be added to this filter, for example a coil connected upstream to the line 15 and downstream, via flow-rate control valve 33, to the intake of the compressor 24.

If the helium storage conditions in the buffer vessel 5 correspond to a supercritical helium state, the procedure described above remains applicable, but the adjustment of the withdrawn helium flow rate by the valve 21 should be controlled by means other than a level detector, for example on the basis of weighing the buffer vessel, which is then mounted on a weighing platform 29'.

Further to the compactness and the simplicity of the installation, it also has the advantage of keeping helium cold as far as the utilization line. The helium gas carried by the latter can therefore be used directly for applications which require a low temperature If necessary, the buffer vessel may be fitted with heating means 31' in order to promote the vaporization and, if appropriate, the heating of the helium withdrawn from this buffer vessel.

The buffer vessel 5 may be arranged fixed on the ultrapure helium utilization site. By way of variant, it may be a mobile vessel which, after filling in the manner described above, is transported to the utilization site and connected to the line 1. In this case, use is made of the procedures for changing containers which are customary in industries consuming ultrapure gases.

It should be noted that, if the buffer vessel 5 has a large volume of, for example, the order of 10,000 l, the control 21–29 as well as the filter cooling device 32 can be omitted. The procedure used is then as follows:

cooling and preparing the filter 4;
completely filling the buffer vessel 5;
using the helium which it contains;
regenerating, cooling and preparing the filter;
filling the buffer vessel; and so on.

We claim:

1. Process for delivering ultrapure helium to a utilization line, comprising the following sequential steps:

withdrawing non-purified helium in liquid or supercritical form at a temperature ranging from about 4.3 K to about 6 K from a storage tank;

filtering withdrawn non-purified helium in liquid or supercritical form;

temporarily storing filtered helium in liquid or supercritical form, in a buffer vessel;

vaporizing the filtered helium to obtain purified gaseous helium;

sending the purified gaseous helium to the utilization line; and wherein the flow rate of liquid or supercritical non-purified helium withdrawn from the storage tank and filtered after withdrawal is adjusted on the basis of a measurement of the quantity of liquid or supercritical filtered helium contained in the buffer vessel.

2. Process according to claim 1, wherein the liquid or supercritical filtered helium is vaporized inside the buffer vessel and purified gaseous helium is drawn off from the buffer vessel.

3. Process according to claim 1, wherein liquid or supercritical filtered helium is drawn off from the buffer vessel and is subsequently vaporized downstream of the buffer vessel.

4. Process according to claim 1, wherein the filter is cooled.

5. Process according to claim 1, wherein before commencing the withdrawal, the filter is flushed and cooled with a helium stream taken from one of the storage tank and the buffer vessel, the flushing and cooling helium being discharged from the filter.

6. Process according to claim 1, wherein the liquid or supercritical non-purified helium is passed directly from the storage tank to the filter.

7. Process according to claim 1, wherein after withdrawal of a predetermined quantity of non-purified helium from the storage tank, the filter is heated, then flushed and cooled with the helium stream taken from one of the storage tank and the buffer vessel, the flushing and cooling helium being discharged from the filter.

8. Process according to claim 1, further comprising monitoring the purity of helium delivered to the buffer vessel.

9. Process according to claim 1, wherein the filter is regenerated after a predetermined quantity of non-purified helium has been withdrawn from the storage tank.

10. Process according to claim 1, wherein the filter is regenerated by heating.

11. Process according to claim 1, wherein the measurement of the quantity of liquid or supercritical filtered helium contained in the buffer vessel is achieved by means of a level detector.

12. Process according to claim 1, wherein the measurement of the quantity of liquid or supercritical filtered helium contained in the buffer vessel is achieved by weighing the buffer vessel.

13. Installation for delivering ultrapure helium, comprising, mounted in series:

a storage tank for storing liquid or supercritical non-purified helium;

a filter fluidly connected to a lower part of the storage tank for filtering liquid or supercritical non-purified helium, and having an outlet for filtered helium;

vaporization means fluidly connected to the outlet of the filter for vaporizing the filtered helium, and having an outlet for purified gaseous helium;

a buffer vessel for temporarily storing the filtered helium, said buffer vessel being positioned between said filter and said vaporization means;

a flow-rate control valve arranged between the filter and the buffer vessel, said flow-rate valve being controlled by the quantity of liquid or supercritical filtered helium contained in the buffer vessel; and a utilization line fluidly connected to the outlet of the vaporization means.

14. Installation according to claim 13, wherein the filter is equipped with a cooling device.

* * * * *